(12) United States Patent
Visco et al.

(10) Patent No.: US 6,458,170 B1
(45) Date of Patent: Oct. 1, 2002

(54) METHOD FOR MAKING THIN, FLAT, DENSE MEMBRANES ON POROUS SUBSTRATES

(75) Inventors: Steven J. Visco, Berkeley, CA (US); Craig P. Jacobson, El Cerrito, CA (US); Lutgard C. De Jonghe, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/205,641

(22) Filed: Dec. 3, 1998

(51) Int. Cl.$^7$ ................................................ H01M 6/00
(52) U.S. Cl. .................. 29/623.4; 29/623.5; 29/623.1; 429/30; 429/41
(58) Field of Search .............................. 429/13, 30, 29, 429/44, 45, 41; 29/623.3, 623.4, 623.5, 623.1

(56) References Cited

U.S. PATENT DOCUMENTS

| | | | | |
|---|---|---|---|---|
| 4,004,944 A | * | 1/1977 | Sandera et al. | 429/215 |
| 4,193,860 A | * | 3/1980 | Folser | 204/284 |
| 5,162,167 A | * | 11/1992 | Minh et al. | 429/30 |
| 5,290,642 A | * | 3/1994 | Minh et al. | 429/33 |
| 5,540,884 A | | 7/1996 | Chiao | 419/47 |
| 5,866,275 A | * | 2/1999 | Kawasaki et al. | 429/30 |

* cited by examiner

*Primary Examiner*—Stephen Kalafut
*Assistant Examiner*—Raymond Alejandro
(74) *Attorney, Agent, or Firm*—Paul R. Martin; Henry Sartorio; David Aston

(57) ABSTRACT

A method of fabricating a thin, flat dense membrane on a porous substrate in which the green substrate is selected to have a predetermined shrinkage on firing which matches or is greater than the shrinkage of a thin uniformly applied film on firing.

15 Claims, 7 Drawing Sheets

(1 of 7 Drawing Sheet(s) Filed in Color)

METHOD FOR MAKING THIN, FLAT, DENSE MEMBRANES ON POROUS SUBSTRATES

BRIEF DESCRIPTION OF THE INVENTION

This invention relates to a process for making thin, flat, dense membranes on porous substrates.

BACKGROUND OF THE INVENTION

Ionic and mixed-conducting ceramic devices such as solid-oxide fuel cells, gas separation membranes, and membrane reactors require a dense electrolyte and highly porous electrodes. The motivation to fabricate thin film ceramic electrolytes derives from the benefits associated with lowering of ohmic losses across ionic and mixed ionic-electronic conducting materials as membrane thickness is reduced. When films are very thin (5–15 $\mu$m) the resistance of the electrolyte at intermediate temperatures is very low, for example a ~10 $\mu$m thick YSZ electrolyte has been shown to have an iR drop of 0.025 $\Omega cm^2$ at 800° C. This allows the device to operate at lower temperatures where less expensive materials may be used in device construction and the devices operate at higher thermodynamic efficiency. The technical challenge involves depositing a pinhole and crack free dense layer of electrolyte 2 to 50 $\mu$m thickness on substrates of high porosity. The film must be well bonded to the substrate without excessive infiltration into the electrode porosity and there must be minimal interface polarization.

Several approaches to thin film fabrication have been reported including physical vapor deposition techniques, tape calendaring, sol-gel deposition, sputtering and colloidal deposition. Many of these approaches have allowed the fabrication of good quality films, however, the high cost of capital equipment and/or operating costs for several of these approaches presents a considerable barrier to their commercialization. Colloidal deposition techniques have been developed and described in the literature.

In the prior art, it was considered important to match the shrinkage rates of film and substrate. Shrinkage rates of film and substrate powders were measured by dilatometry. Although the match of shrinkage rates are still considered important, substantial improvements have been made through the discovery of the importance of matching total shrinkage of film and substrate which is a function of both shrinkage rate and green substrate density. In addition, improvements have been made in the deposition of very homogeneous thin films. In prior work, films were applied to porous substrates by inverse slip casting where porous substrates were either dipped into the YSZ suspension or the suspension was applied with a pipette to the surface of the substrate or dipping the substrate into a solution. In some cases this procedure led to pinhole free, dense, electrolyte membranes on porous substrates. A number of these structures also performed well electrochemically. However, the procedure also led to inhomogeneities in the film (differential densification) as well as different shrinkage rates for film and substrate. Quite often the bilayers were severely warped, and could only be made flat by use of substantial mass ($\approx$100 grams/cm$^2$) on the thin-film structure while sintering. This often led to significant edge curl, which poses significant or insurmountable problems in terms of ultimate use of these structures in solid oxide fuel cell (SOFC) stacks. Furthermore, application of the film by dip coating or application of wet dispersion often led to mud cracking and/or variations in film thickness and local green density of the film across the substrate surface.

Colloidal deposition of dense electrolyte layers on porous substrates requires that the materials be chemically compatible at the processing temperature and there must be an adequate thermal expansion match between the layers. The sintering behavior of both film and substrate materials needs to be considered. Once compatible materials have been selected, fabricating dense films of 2–50 $\mu$m is achieved by careful control of the sintering profile (shrinkage vs. temperature) and the magnitude of the shrinkage of the materials. This is accomplished by systematically modifying the sintering profiles of film and substrate through control of particle size and morphology of green substrates. Poor understanding of these parameters often leads to electrolyte films of low density (pinholes) or cracked films composed of islands of high density film. Even in cases where the shrinkage of film and substrate are sufficiently close to generate dense electrolyte films, residual stresses can lead to highly distorted films with significant curling. Importantly, the electrode substrate must be processed to yield continuous porosity and a high surface area microstructure, without compromising the strength of the bilayer.

OBJECTS AND SUMMARY OF THE INVENTION

It is a general object of the present invention to provide a method of thin, dense colloidal deposition and sintering whereby high quality films of a wide variety of ionic and mixed ionic-electronic conductors can be deposited onto highly porous electrode substrates.

It is another object of the present invention to provide a method of forming thin, dense films on a substrate in which the sintering profiles of films and substrates are matched to the extent that bilayers can be free sintered to a high degree of flatness with no compressive load (or with minimal load).

It is a further object of the present invention to provide a highly flexible process in which a wide variety of materials can be deposited as thin films with no (or minimal) alterations to fabrication equipment.

It is a further object of the present invention to provide a process in which only small amounts of material are needed for bilayer fabrication making the process suitable for novel or expensive conductors.

The foregoing and other objects of the present invention are achieved by first forming a homogeneous porous substrate having a predetermined green density, aerosol spraying a suspension of homogeneous film on the surface of said substrate, firing the bilayer to sinter the film, said green substrate density being selected so that the total shrinkage of the fired film and green substrate during sintering is such that the film shrinkage is equal to or less than that of the green substrate.

BRIEF DESCRIPTION OF THE DRAWINGS

The file of this patent contains at least one photograph executed in color. Copies of this patent with color photograph(s) will be provided by the Patent and Trademark Office upon request and payment of necessary fee.

The invention will be more clearly understood from the following description read in conjunction with the accompanying drawings of which.

DESCRIPTION OF THE PREFERRED EMBODIMENT(S)

While attempting to fabricate large area flat bilayer plates, it was recognized that exceptionally good homogeneity of both substrate and film was necessary to avoid differential densification and warping of the bilayer structure. It was also recognized that matching of both the sintering rate and total shrinkage of both film and substrate was key to avoiding warpage of the bilayer during firing. It was found that one method of achieving this effect would be by the use of identical electrolyte powders in both the porous substrate and the dense film.

Figure 1:
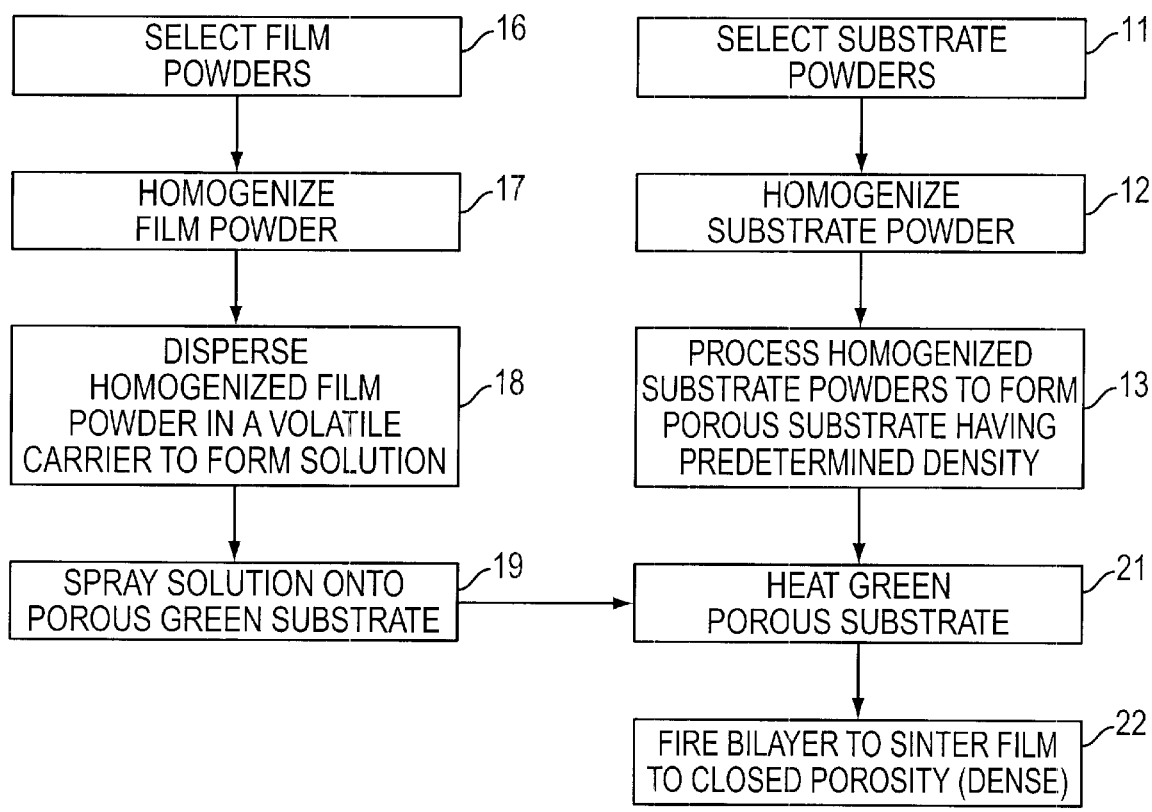
FIG. 1 is a flow chart illustrating the method of making thin, flat, dense ceramic membranes on porous substrates.

Referring particularly to FIG. 1, the steps in fabrication of flat, thin-film bilayers in accordance with the invention is illustrated. The desired substrate or electrolyte powders 11 are obtained commercially or synthesized through solid state reaction or combustion synthesis. The powders are then homogenized 12 as by attrition milling and divided into two batches. One batch of the powder is used to formulate the substrate and the other is dispersed in solution for thin-film application. In this way, the substrate and film are made from electrolyte powders having essentially the same shrinkage driving force during sintering. Alternatively, the substrate powder is selected or modified such that the shrinkage during sintering of the green substrate closely matches the shrinking of sintering of the electrolyte. The substrate powders, typically electrolyte +NiO, are well mixed to ensure homogeneity. The substrate powders are pressed or tape cast 13 to a predetermined green density. The green density is increased or decreased until the shrinkage of the substrate during firing matches or exceeds that of the shrinkage of the thin film as the film densifies from the green state to closed porosity.

The thin film electrolyte powder 16, which has been selected and homogenized 17 is dispersed in a volatile carrier to form a solution 18. The solution is applied to the substrate as by aerosol spraying 19 as opposed to reverse slip casting used in the prior art. In the slip-casting procedure, control of green density is quite difficult, and one cannot visually detect imperfections in the film. It is also difficult to control the thickness of the film using reverse slip casting. In the present invention, the electrolyte film is sprayed onto the heated green substrate 21. The substrate is held at moderate temperatures (50 to 300° C.) and the electrolyte suspension is sprayed using an airbrush or similar device onto the substrate. In this way the carrier solution of the colloidal dispersion is rapidly removed allowing the deposition of green films of varying thickness having high uniformity in both thickness and density across the surface of the substrate. Visual inspection and resultant sintering studies show very high evidence of the quality of the films. The bilayer structures are fired 22 at sufficiently high temperatures to sinter the thin-films. After firing, the aerosol sprayed structures were remarkably flat. In many cases, the bilayers could be fired in the absence of added weight, or with pressures of approximately a few grams/cm². These techniques were used to successfully fabricate bilayers using yttria-stabilized zirconia, gadolinia-doped ceria, and strontium zirconate electrolytes.

The aerosol spray technique was also found to be beneficial for the application of the second electrode on the bilayer structure. For the case of a NiO—YSZ/YSZ structure, the air electrode, lanthanum strontium manganate (LSM) was applied by spray techniques, leading to highly reproducible performance in a solid oxide fuel cell.

For the successful deposition of thin, flat films on porous substrates, several criteria must be met. Clearly, the substrate must be porous. This is important for both the intended applications (fuel cells, gas separation, etc.) and for the wicking action that occurs when a suspension of colloidal particles is applied to the substrate. Also, the powder form which the thin film will be prepared, must be well dispersed in solution and be stable for several hours, or preferably, many days. It is also important that the wicking action takes place upon application of the suspension to the substrate; this should be the case for most porous substrates. The use of a heated substrate is preferable in that pooling of the suspension is avoided as well as mud cracking of the deposited green films. It is important that the substrate and as-deposited film be homogeneous on a micron scale; large variations in composition or green density of the substrate or film could lead to differential densification and warping of the sintered bilayer. As described above, homogenization of the substrate is typically accomplished through careful milling of the substrate powders. Homogeneous thin films can be deposited through the use of compressed air spraying using an airbrush, paint-sprayer, or related technique. It is also important that the shrinkage profiles of the film and substrate be well matched. However, to achieve bilayers that sinter flat, a critical parameter is the relative total shrinkage of the film and substrate. This is controlled not only by the selection of the materials, but primarily by controlling the density of the green substrate.

Figure 2:
FIG. 2 shows a bilayer structure in which the dense film has on firing a greater relative shrinkage than the substrate.
Figure 3:
FIG. 3 shows a bilayer structure in which the dense film has on firing a relative shrinkage equal to that of the substrate.
Figure 4:
FIG. 4 shows a bilayer structure in which the dense film has on firing a lesser relative shrinkage than the substrate.
Figure 5:
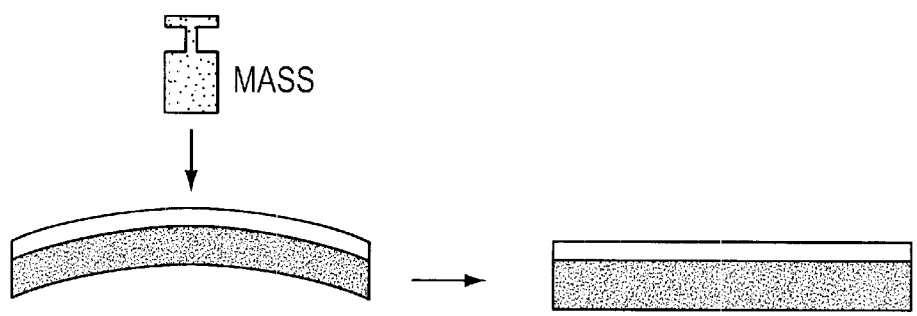
FIG. 5 shows the formation of a pressed flat bilayer in which the dense film had on firing a shrinkage which was less than that of the substrate.
Figure 6:
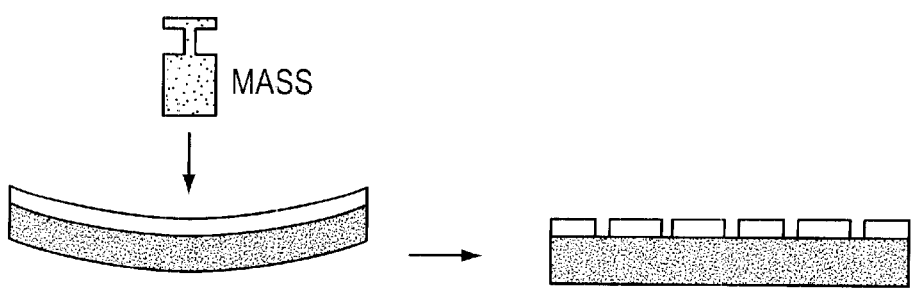
FIG. 6 shows the formation of a pressed flat bilayer in which the dense film had on firing a shrinkage greater than that of the substrate.

The following scenarios are possible: a) the film shrinks more than the substrate (film in tension, FIG. 2); b) the substrate shrinks more than the film (film in compression, FIG. 4); c) the shrinkage matches exactly, FIG. 3. In FIG. 2 the film shrinkage exceeds that of the substrate, thereby putting the thin film in tension. In this scenario, application of a force during sintering of the bilayer typically leads to porosity in the thin film, FIG. 6, and poor performance of the bilayer. In the ideal situation, FIG. 3, the film and substrate have identical shrinkage profiles and total shrinkage, leading to a flat bilayer after firing, with no residual stress. Since this is very difficult to attain in practice, it was discovered that FIG. 4 leads to high performance bilayer structures. In this case, the shrinkage of film and substrate are adjusted such that the total shrinkage of the substrate exceeds slightly that of the deposited film. In this way, the film is in slight compression, and can be easily flattened by application of a minimal force during sintering of the bilayer, FIG. 5. Shrinkage profiles of the substrate and film are adjusted by techniques known to those in the ceramics field. The driving force for sintering is a function of particle size, and can be adjusted accordingly. It is desirable that the film shrinkage be in the range of 0 to 5% less than the total shrinkage of the substrate. It is also important that the colloidal solution be applied in such a way that dirt particles, hair, or other debris, do not deposit concurrently with the thin film. Films are typically very thin ($<\frac{1}{10}^{th}$ the size of a human hair) and small flaws lead to pinholes and potential cracks which diminish the performance of the structure.

The following are examples of the fabrication of bilayer structures and solid oxide fuel cells in accordance with the method of the present invention.

EXAMPLE 1

Figure 7:
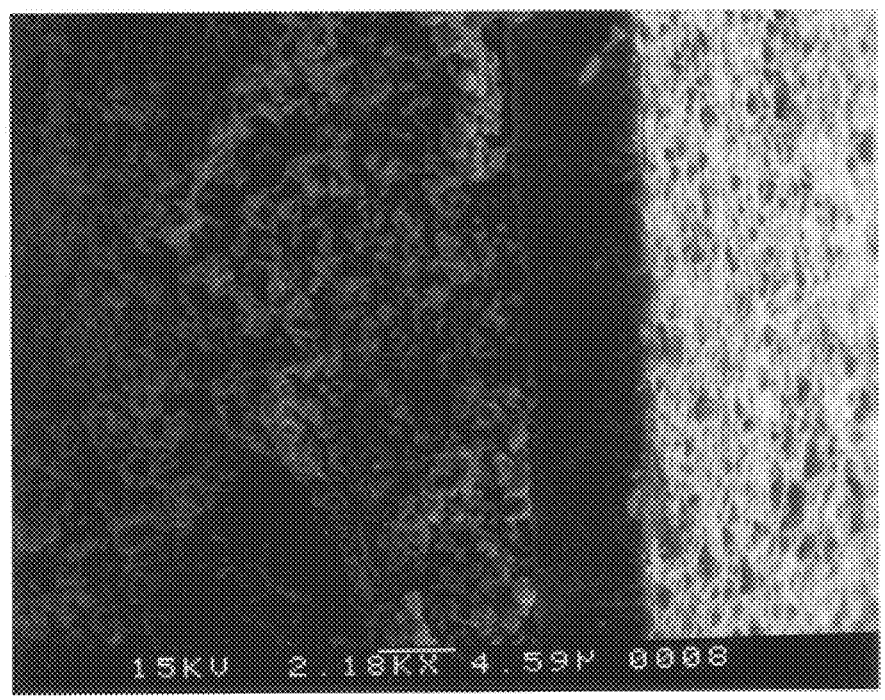
FIG. 7 is a scanning electron micrograph of a 7 $\mu$m YSZ film on Ni—YSZ substrate fabricated in accordance with example 1.

Ionic (Oxygen) Conductor on Cermet Precursor—
YSZ Thin Film on Porous NiO/YSZ Substrate Yttria stabilized zirconia (YSZ), NiO and a binder/pore former (corn starch) were obtained from commercial vendors (Tosoh Corporation, J.T. Baker Inc., and CPC International Inc. respectively). The substrate powders consisting of 54 wt % NiO, 36 wt % YSZ and 10 wt % corn starch were attritor milled with zirconia milling balls at 550 rpm for 3 hours in acetone. The powder was dried and sieved to <100 $\mu$m using a stainless steel wire sieve. 2.5 g of powder were uniaxially pressed in a 3.81 cm (1.5 in) steel die at 10,000 lbs. The substrate was fired in an air furnace using the following schedule: 1° C./min to 400° C., hold for 1 hour, 5° C./min to 900° C., hold for 8 hours, 5° C./min to room temperature. The green substrate now had sufficient strength for thin film deposition. The substrate was placed on a hot plate and held at ~100–150° C. while ~12 ml of the electrolyte suspension (3 g YSZ ultrasonically dispersed in 100 ml isopropyl alcohol) was sprayed onto the substrate using an airbrush. During deposition, it is ensured that the suspension hits the surface of the substrate while wet, allowing the remaining solvent to wick into the porous substrate before evaporation. No pooling of the solution on the substrate is allowed. The green bilayer was then sintered along with the substrate using the following schedule: 5° C./min to 950° C., hold for 4 hours, 5° C./min to 1400° C., hold for 4 hours, 5° C./min to room temperature. During sintering, a ~45 g alumina disk was placed on top of the bilayer to ensure flatness. The resulting bilayer was very flat and consisted of a porous NiO/YSZ substrate with a dense pinhole free film of YSZ of approximately ~7 $\mu$m thickness. An electron scanning micrograph of a section through the bilayer is shown in FIG. 7.

EXAMPLE 2

Concave/convex YSZ on NiO/YSZ Substrates

A bilayer was prepared in an identical manner as Example 1 with the exception that no alumina weight was placed on the structure during sintering. The bilayer sintered without the alumina weight results in a convex disk (thin film side up). The film was pinhole free.

Bilayers were prepared as in Example 1 with the following change: the substrate powders were pressed at 15,000 lbs. instead of 10,000 lbs. This resulted in a substrate having a higher green density and which resulted in smaller shrinkage during sintering. Bilayers were sintered with and without a 45 g alumina weight. The sample sintered without the alumina weight was concave (thin film side up). The film was pinhole free. The sample sintered with the alumina weight was flat, but the film had pinholes and was not gas tight.

EXAMPLE 3

Airbrush Technique vs. Pipette Technique

Figure 8A:
FIGS. 8A–B are top surface scanning electron micrograph of a YSZ film on a NiO—YSZ substrate formed in accordance with example 1, and in accordance with the prior art respectively.
Figure 8B:
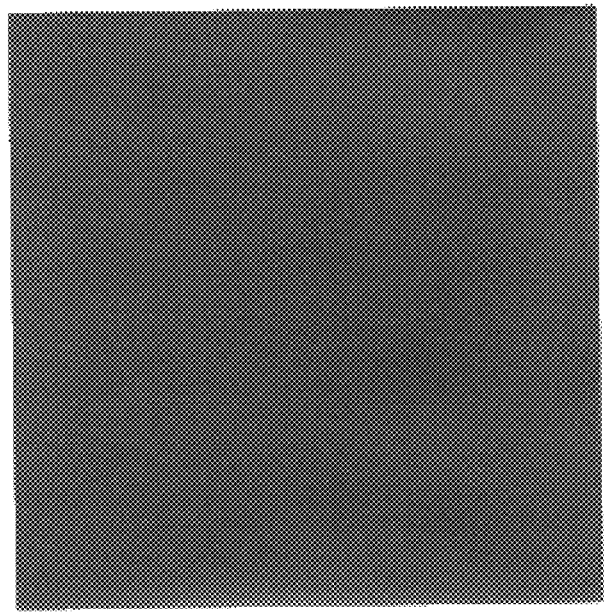

Substrates were prepared as in Example 1. The electrolyte layer of one sample was applied by dripping YSZ solution onto the porous electrode substrate via a pipette. This sample was sintered at 1400° C. with an alumina plate weighing in excess of 10 g/cm$^2$ on top. The resulting bilayer was not flat and possessed significant edge curl and surface irregularities, FIG. 8A. Additional creep flattening of the bilayer was attempted using >100 g/cm$^2$. The bilayers remained uneven. The electrolyte layer on a second sample was applied using an airbrush as in Example 1. This sample was sintered at 1400° C. with an alumina plate weighing <5 g/cm$^2$ on top. The resulting bilayer was very flat and very homogeneous, FIG. 8B.

EXAMPLE 4

Figure 9:
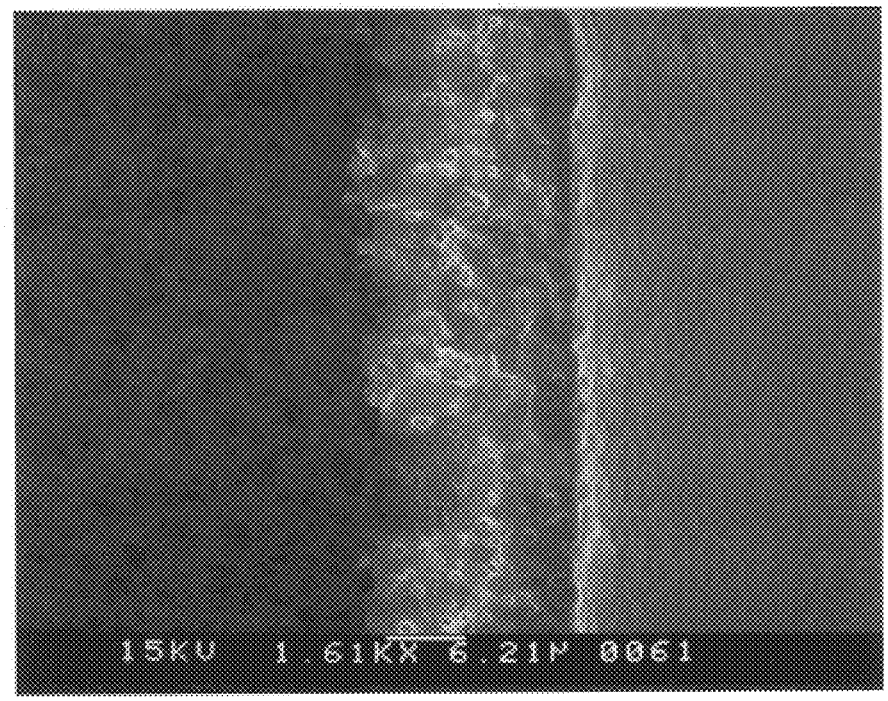
FIG. 9 is a scanning electron micrograph of a 15 $\mu$m CGO film on an NiO—CGO substrate.

Mixed Ionic Electronic Conductor on Cermet
Precursor-Doped Ceria Thin Film on Porous NiO/
ceria Substrate Gadolinia doped ceria (CGO), NiO and a binder/pore former (corn starch) were obtained from commercial vendors (NexTech Materials, Inc., J.T. Baker Inc., and CPC International Inc. respectively). The CGO powder was fired at 1000° C. for 4 hours and then attritor milled at 550 rpm for 2 hours. This powder was divided into two batches, one batch for the electrode substrate and the second batch for the electrolyte. The electrode substrate powders consisting of 54 wt % NiO, 36 wt % CGO and 10 wt % corn starch were attritor milled with zirconia milling balls at 550 rpm for 3 hours in acetone. The powder was dried and sieved to <100 $\mu$m using a stainless steel wire sieve. 2.5 g of powder were uniaxially pressed in a 3.81 cm (1.5 in) steel die at 10,000 lbs. The substrates were fired in an air furnace using the following schedule: 1° C./min to 400° C., hold for 1 hour, 5° C./min to 950° C., hold for 8 hours, 5° C./min to room temperature to form the green substrate. The substrate now had sufficient strength for thin film deposition. The substrate was placed on a hot plate and held at ~100–150° C. while ~18 ml of the electrolyte suspension (3 g CGO ultrasonically dispersed in 100 ml isopropyl alcohol) was sprayed on using an airbrush. During deposition, it was ensured that the suspension hit the surface of the substrate while wet, allowing the remaining solvent to wick into the porous substrate before evaporation. No pooling of the solution on the substrate was allowed. The green bilayer was then sintered using the following schedule: 5° C./min to 950° C., hold for 4 hours, 5° C./min to 1450° C., hold for 4 hours, 5° C./min to room temperature. During sintering a ~45 g alumina disk was placed on top of the bilayer to ensure flatness. The resulting bilayer was very flat and consisted of a porous NiO/CGO substrate with a dense pinhole free film of CGO of approximately 15 μm thickness. A scanning electron micrograph of a section of the bilayer is shown in FIG. 9.

EXAMPLE 5

Figure 10:
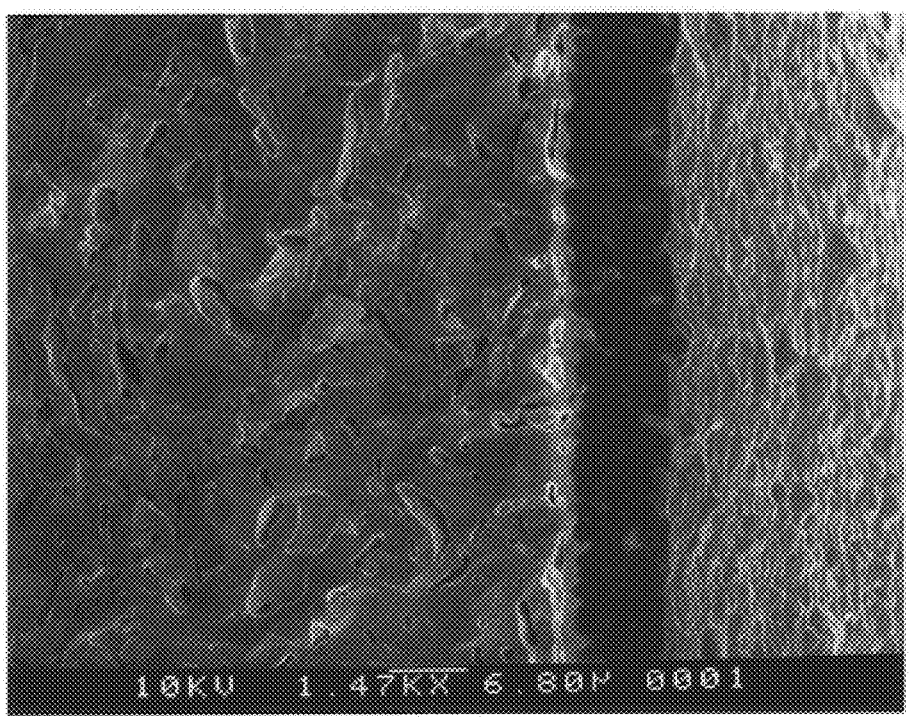
FIG. 10 is a scanning electron micrograph of an 8 $\mu$m $La_{0.8}Sr_{0.2}Co_{0.8}Fe_{0.2}O_{3-}$ film on ceria.

Mixed Ionic Electronic Conductor on Mixed Ionic Electronic Conductor—LSCF Thin Film on Porous Ceria Substrate Powders of $La_{0.8}Sr_{0.2}Co_{0.8}Fe_{0.2}O_{3-}$ (LCSF) and Samaria doped ceria (CSO) were made by the glycine nitrate combustion process. These were fired at 1000° C. for 4 hours. The LSCF was attritor milled for 3 hours at 550 rpm in acetone. The CSO was mixed with 10 wt % corn starch and attritor milled for 3 hours at 550 rpm. Substrate formation and thin film application and sintering were as in Example 1. The resulting sintered film was pinhole free and approximately 8 μm in thickness. FIG. 10 is a scanning electron micrograph of the section taken through the bilayer

EXAMPLE 6

Figure 11:
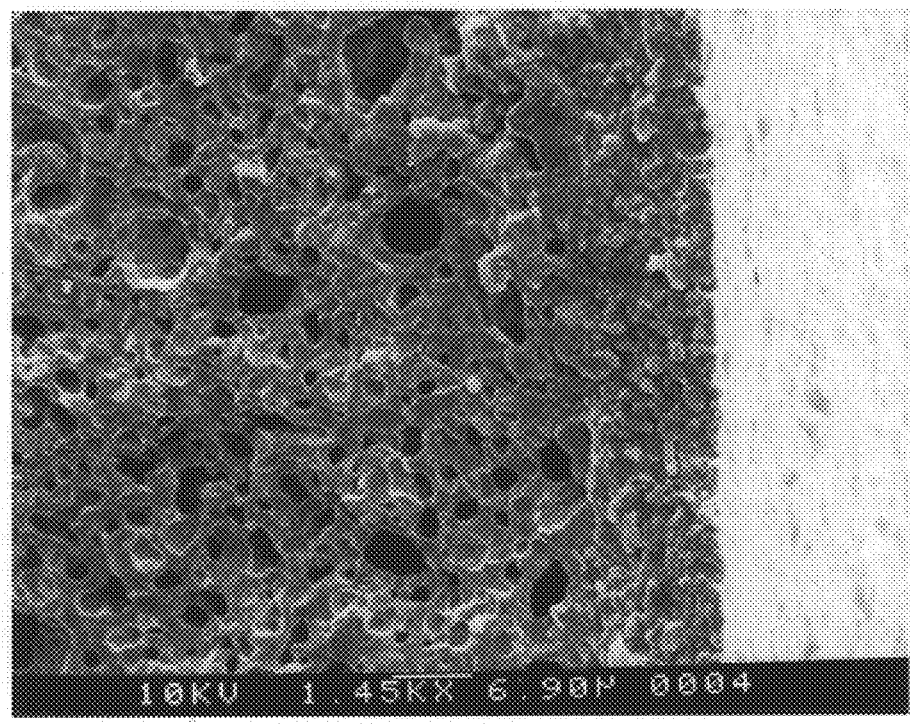
FIG. 11 is a scanning electron micrograph of a 10 $\mu$m $SrZr_{0.95}Y_{0.05}O_3$ on an NiO ceria substrate.

Proton Conductor (Ionic) on Mixed Ionic-Electronic Conductor—Strontium Zirconate on NiO/ceria Substrate A substrate consisting of NiO and Gadolinia doped ceria (CGO) was prepared as in Example 4. An electrolyte composed of $SrZr_{0.95}Y_{0.05}O_3$ was prepared by the glycine nitrite combustion method and fired and milled as in Example 5. The film was applied as in Example 1 and sintered at 1400° C. for 2 hours. The resulting thin film was pinhole free and approximately 10 μm thick. FIG. 11 is a scanning electron micrograph taken through a section of the bilayer.

EXAMPLE 7

Ionic Conductor on Ionic Conductor—YSZ on YSZ Substrate

Figure 12:
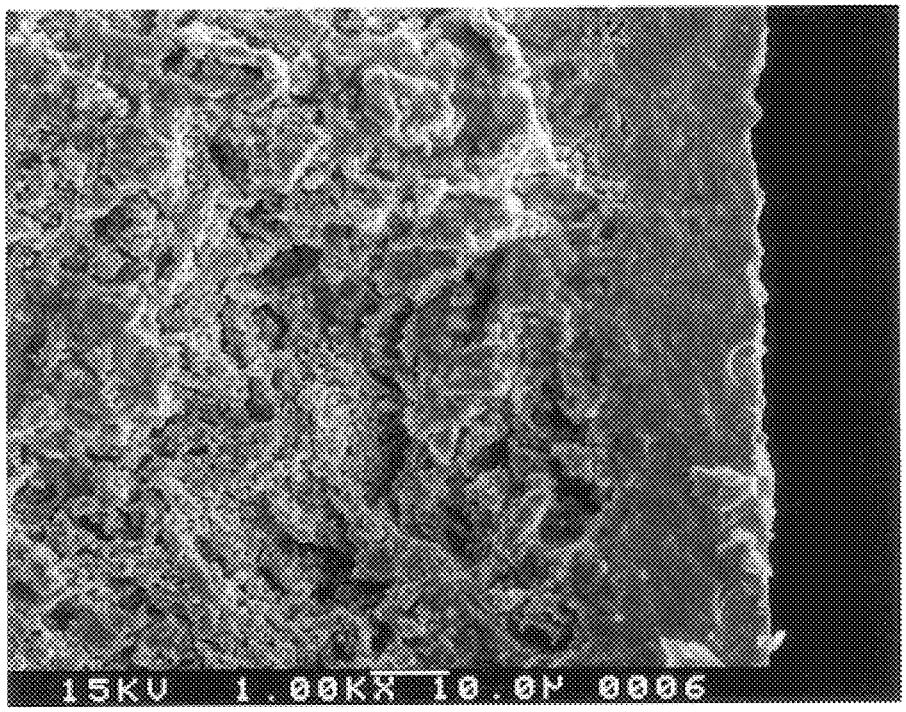
FIG. 12 is a scanning electron micrograph of a 20 $\mu$m YSZ film on porous YSZ.

A bilayer was prepared as in Example 1 with this exception: the NiO was replaced by YSZ. The resulting thin film was pinhole free and the substrate porous, FIG. 12.

EXAMPLE 8

Solid Oxide Fuel Cell Based on Oxygen Conducting Electrolyte (Yttria Stabilized Zirconia)

Figure 13:
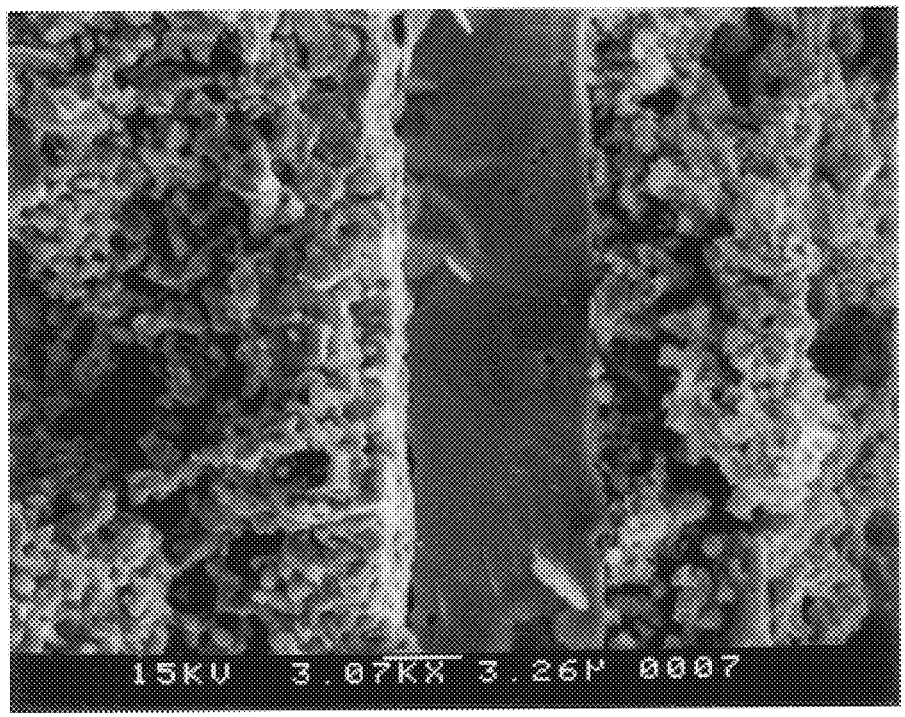
FIG. 13 is a scanning electron micrograph of a fuel cell including an LSM—YSZ cathode and YSZ electrolyte on a Ni—YSZ anode substrate.

A sintered bilayer was prepared as in Example 1. An electrode material consisting of 55 wt % $La_{0.85}Sr_{0.15}MnO_3$ (LSM) and 45 wt % YSZ was attritor milled for 1 hour at 550 rpm in acetone. Porous electrode was dispersed in isopropyl alcohol and deposited on the YSZ film by spray technique as described in Example 1. The fuel cell structure was then fired at 1100° C. for 4 hours. The electrode was very homogeneous and well bonded, FIG. 13. The performance of the solid oxide fuel cell tested with $H_2$+3 vol % $H_2O$ as the fuel and air as the oxidizer was excellent.

EXAMPLE 9

Solid Oxide Fuel Cell Based on Mixed Ionic-electronic Electrolyte (Doped Ceria)

Figure 14:
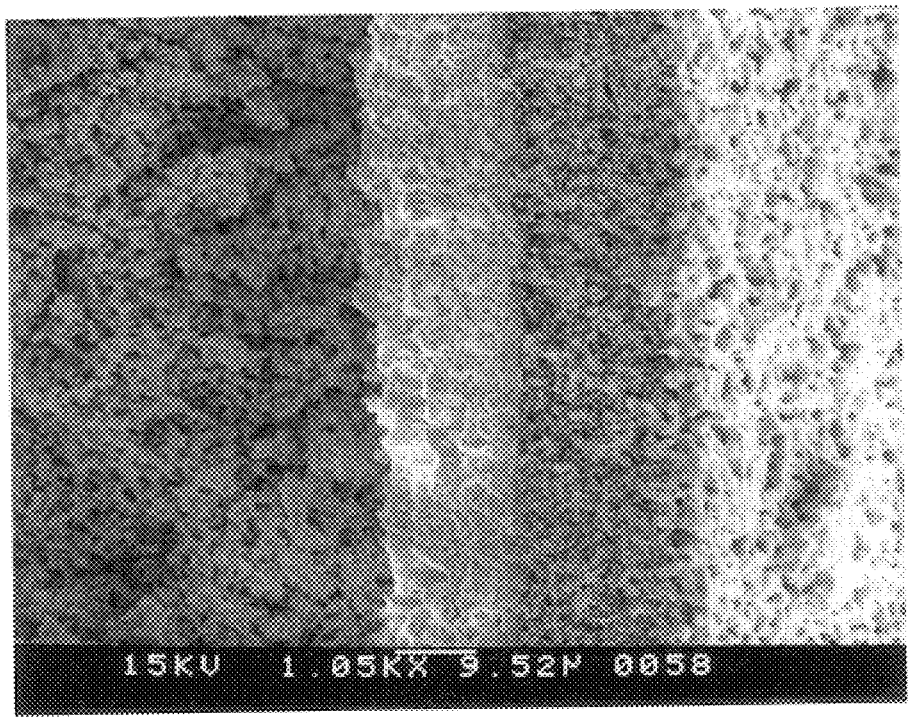
FIG. 14 is a scanning electron micrograph of a fuel cell including an LSCN/CGO cathode CGO electrolyte on a Ni—CGO anode substrate.

A bilayer was prepared as in Example 4. A porous electrode consisting of 55 wt % $La_{0.60}Sr_{0.40}Co_{0.98}Ni_{0.02}O_3$ and 45 wt % CGO was deposited and fired on the CGO film by spray technique as in Example 8. The electrode was very homogeneous and well bonded, FIG. 14. The performance of the solid oxide fuel cell tested with $H_2$+3 vol % $H_2O$ as the fuel and. air as the oxidizer was excellent.

EXAMPLE 10

Solid Oxide Fuel Cell Based on Proton Conducting Electrolyte (Strontium Zirconate)

Figure 15:
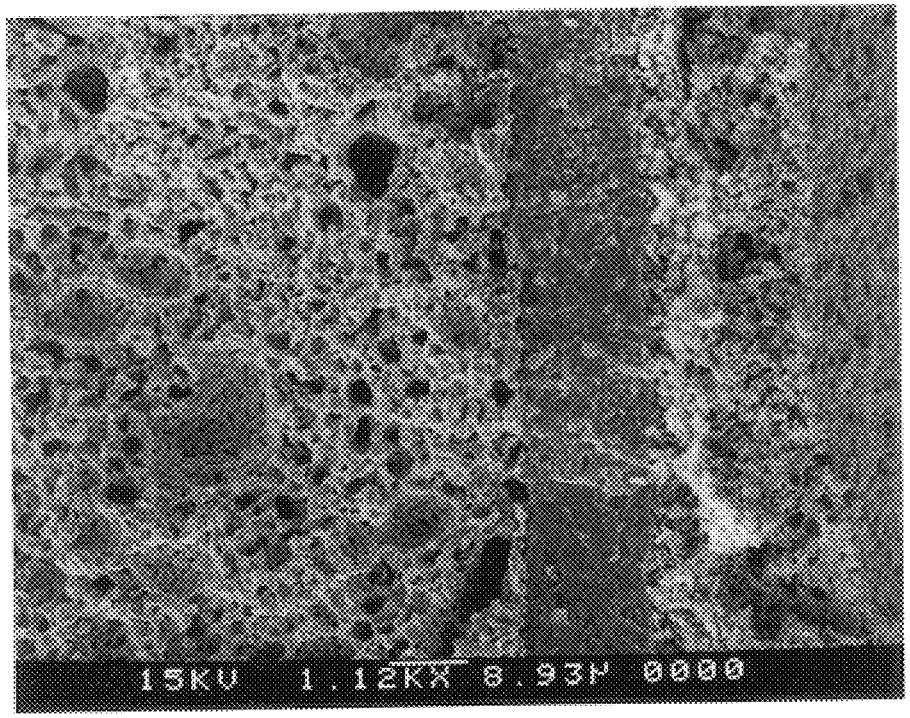
FIG. 15 is a scanning electron micrograph of a fuel cell including an LSCN—$SrZr_{0.95}O_3$ cathode, $SrZr_{0.95}Y_{0.05}O_3$ electrolyte and Ni—CGO anode substrate

A sintered bilayer was prepared as in Example 6. A porous electrode consisting of 55 wt % $La_{0.60}Sr_{0.40}Co_{0.98}Ni_{0.02}O_3$ and 45 wt % $SrZr_{0.95}Y_{0.05}O_3$ was deposited and fired on the $SrZr_{0.95}Y_{0.05}O_3$ film by spray technique as in Example 8. The electrode was very homogeneous and well bonded, FIG. 15.

What is claimed is:

1. A method of fabricating a bilayer structure consisting of a porous substrate with a bonded dense thin film comprising the steps of forming a homogeneous porous substrate layer and curing it to a predetermined green density, applying by means of an aerosol spray a uniform suspension of a film material in a volatile carrier onto the surface of said substrate to form a thin green film layer of a predetermined thickness, volatilizing said carrier, and firing the bilayer formed by said green film layer and said substrate layer to sinter thin green film layer and substrate, said substrate having a predetermined green density selected such that the total shrinkage of the fired green film layer and fired substrate layer is such that the film shrinkage is equal to or less that that of the fired substrate.

2. The method of claim 1 in which the substrate density and composition and the film composition are selected so that the substrate has a total shrinkage after firing between 0 and 10% more than the total shrinkage of the film after firing.

3. The method of claim 1 in which the substrate density and composition and the film composition are selected so that the substrate has a total shrinkage after firing between 0 and 5% more than the total shrinkage of the film after firing.

4. The method of claim 1 in which the substrate density and composition and the film composition are selected so that the substrate has a total shrinkage after firing between 0 and 2% more than the total shrinkage of the film after firing.

5. The method of claim 1 in which the substrate density and composition and the film composition are selected so that the substrate has a total shrinkage after firing between 0 and 1% more than the total shrinkage of the film after firing.

6. The method of claims 1, 2, 3, 4 or 5 in which the substrate is between 0–300° C. when the film is applied.

7. The method of claim 1 in which the film material is selected so that the sintered film formed after said thin green film layer is fired is ionically conducting.

8. The method of claim 1 in which the film material is selected so that the sintered film formed after said thin green film layer is fired is a mixed ionic-electronic conductor.

9. The method of claim 7 in which the substrate material is selected so that the sintered substrate formed after said substrate is fired is a mixed ionic-electronic conductor.

10. The method of claim 8 in which the substrate material is selected so that the sintered substrate formed after said substrate is fired is a mixed ionic-electronic conductor.

11. A method of fabricating a fuel cell structure consisting of a porous anode with a bonded dense electrolyte and a cathode comprising the steps of forming a homogeneous porous anode substrate layer and curing it to a predetermined green density, applying by means of an aerosol spray a uniform suspension of electrolyte film material in a volatile carrier onto the surface of the substrate to form a thin layer of green film of a predetermined thickness, volatilizing said carrier, firing the bilayer formed by said green film layer and said substrate layer to sinter thin green film layer and substrate, said substrate having a predetermined green density selected such that the total shrinkage of the fired green film layer and fired substrate layer is such that the film shrinkage is equal to or less than that of the fired substrate, and depositing a cathode material onto the film bilayer and firing the combination of cathode material and bilayer to form the fuel cell.

12. The method of claim 11 which the substrate density and composition and the film composition are selected so that the substrate has a total shrinkage after firing between 0 and 10% more than the total shrinkage of the film after firing.

13. The method of claim 12 in which the anode is NiO-yttria stabilized zirconium oxide, the electrolyte is yttria stabilized zirconium oxide and the cathode is lanthanum strontium manganese oxide—yttria stabilized zirconium oxide.

14. The method of claim 1, in which the anode is NiO—gadolinia doped cerium oxide, the electrolyte is gadolinia doped cerium oxide and the cathode is lanthanum strontium cobalt nickel oxide/gadolinia doped cerium oxide.

15. The method as in claim 12 in which the anode substrate is NiO—gadolinia doped cerium oxide, and the electrolyte is $SrZr_{0.95}Y_{0.05}O_3$.

* * * * *